US012036558B2

(12) United States Patent
Miyazaki et al.

(10) Patent No.: US 12,036,558 B2
(45) Date of Patent: Jul. 16, 2024

(54) TEMPERATURE ADJUSTMENT STAGE (71) Applicant: Otsuka Pharmaceutical Co., Ltd., Tokyo (JP)

(72) Inventors: Koji Miyazaki, Hino (JP); Hideyuki Fujii, Yoshikawa (JP); Ko Osawa, Hino (JP); Takanori Murayama, Tachikawa (JP)

(73) Assignee: OTSUKA PHARMACEUTICAL CO., LTD., Tokyo (JP)

( * ) Notice: Subject to any disclaimer, the term of this patent is extended or adjusted under 35 U.S.C. 154(b) by 967 days.

(21) Appl. No.: 16/963,428

(22) PCT Filed: Oct. 24, 2018

(86) PCT No.: PCT/JP2018/039458
§ 371 (c)(1),
(2) Date: Jul. 20, 2020

(87) PCT Pub. No.: WO2019/146190
PCT Pub. Date: Aug. 1, 2019

(65) Prior Publication Data
US 2021/0069716 A1 Mar. 11, 2021

(30) Foreign Application Priority Data
Jan. 29, 2018 (JP) ................. 2018-012570

(51) Int. Cl.
*G01N 21/03* (2006.01)
*B01L 7/00* (2006.01)
(Continued)

(52) U.S. Cl.
CPC ............... *B01L 7/00* (2013.01); *G01N 21/03* (2013.01); *G01N 21/41* (2013.01); *G01N 31/22* (2013.01)

(58) Field of Classification Search
CPC ........ G01N 21/03; G01N 21/41; G01N 31/22; B01L 7/00
See application file for complete search history.

(56) References Cited

U.S. PATENT DOCUMENTS

| 2004/0137604 | A1* | 7/2004 | Goodman | ............... B01L 9/527 435/288.3 |
| 2007/0148780 | A1* | 6/2007 | Murata | ............... G01N 21/0332 436/147 |
| 2009/0023201 | A1 | 1/2009 | Hongo et al. | |

FOREIGN PATENT DOCUMENTS

| EP | 1650570 A1 | 4/2006 |
| JP | H07-174765 A | 7/1995 |

(Continued)

OTHER PUBLICATIONS

EPO, Extended European Search Report for the corresponding European patent application No. 18902197.5, dated Feb. 16, 2021.
(Continued)

*Primary Examiner* — Brian R Gordon
*Assistant Examiner* — Dwan A Gerido
(74) *Attorney, Agent, or Firm* — LUCAS & MERCANTI, LLP (57) ABSTRACT

To provide a temperature adjustment stage that can efficiently heat a cartridge in accordance with necessity of heating each well. A temperature adjustment stage for heating a cartridge in which a plurality of wells that store a liquid are formed. The cartridge is used in an inspection system that detects an object captured by an immunoreaction, the wells include a labeled antibody well that stores a labeled antibody that labels the object, and there is provided a structure that does not heat the labeled antibody well.

12 Claims, 7 Drawing Sheets

(51) Int. Cl.
    *G01N 21/41*    (2006.01)
    *G01N 31/22*    (2006.01)

(56)            References Cited

FOREIGN PATENT DOCUMENTS

| JP | 2004117341 A  | 4/2004  |
|----|---------------|---------|
| JP | 2004294130 A  | 10/2004 |
| JP | 2010139332 A  | 6/2010  |
| JP | 2016200604 A  | 12/2016 |
| WO | 2005008255 A1 | 1/2005  |
| WO | 2005064348 A1 | 7/2005  |
| WO | 2017082196 A1 | 5/2017  |

OTHER PUBLICATIONS

Epo, Extended European Search Report for the corresponding European patent application No. 22170509.8, dated Jul. 5, 2022.
Office Action for the corresponding Japanese patent application No. 2019-567854 dated Oct. 18, 2022, and a translation thereof.
International Search Report dated Jan. 15, 2019 for corresponding Application No. PCT/JP2018/039458 and English translation.
Written Opinion dated Jan. 15, 2019 for corresponding Application No. PCT/JP2018/039458 and English translation.

\* cited by examiner

TEMPERATURE ADJUSTMENT STAGE

CROSS REFERENCE TO RELATED APPLICATION

This Application is a 371 of PCT/JP2018/039458 filed on Oct. 24, 2018 which, in turn, claimed the priority of Japanese Patent Application No. 2018-012570 filed on Jan. 29, 2018, both applications are incorporated herein by reference.

TECHNICAL FIELD

The present invention relates to a temperature adjustment stage for heating a cartridge used in an inspection system that detects an object captured by an immunoreaction.

BACKGROUND ART

Conventionally, it is known that biochemical reactions and immunoreaction are greatly affected by temperature. For example, in a fully automatic biochemical reaction device or immunoreaction device using a sensor chip, a reagent such as a reaction solution and a cleaning liquid is sequentially introduced into the sensor chip inside the device. Therefore, temperature inside the sensor chip is greatly affected by temperature of the introduced reagent.

Here, since it is known that temperature inside the sensor chip (reaction field) is greatly affected by temperature of the reagent used, it is necessary to control the reagent temperature.

As the reagent temperature, various cases are assumed such as after being adapted to temperature of surroundings, that is, temperature of a measurement environment (hereinafter referred to as ambient temperature), or immediately after being taken out from a storage (refrigerator), and liquid temperature used may differ for each measurement. This affects system performance such as reproducibility of measurement.

As an invention for addressing such a problem, there is known an automatic analyzer (for example, see Patent Literature 1) provided with a reactor vessel storing table made of a material having thermal conductivity. According to this automatic analyzer, a highly accurate analysis result can be obtained by maintaining a reaction solution in a reactor vessel (cartridge) within a predetermined temperature range in advance.

CITATION LIST

Patent Literature

Patent Literature 1: JP 2010-139332 A

SUMMARY OF INVENTION

Technical Problem

However, as in the automatic analyzer described above, in a case where the reaction solution in the reactor vessel is heated on the reactor vessel storing table, there is a problem that heating efficiency varies depending on a liquid amount of the reaction solution and a size of a well that stores the reaction solution. Specifically, a well with a small liquid amount and a small capacity is heated in a short time, and a well with a large liquid amount and a large capacity takes time for heating.

In addition, it is desirable not to heat a labeled antibody liquid before reaction, because there is a concern that the antibody will be denatured to lower reaction efficiency when heated. However, when the labeled antibody liquid is dispensed into the well of the reactor vessel, it is heated together with the reaction solution dispensed into another well.

In order to solve such problems, a method of providing a plurality of heaters corresponding to each well and heating each well under different conditions is conceivable, but this causes an increase in cost.

An object of the present invention is to provide a temperature adjustment stage that can efficiently heat a cartridge in accordance with necessity of heating each well.

Solution to Problem

In order to solve the above problems, the present invention includes the following items.

[1] A temperature adjustment stage for heating a cartridge in which a plurality of wells that store a liquid are formed, in which
  the cartridge is used in an inspection system that detects an object captured by an immunoreaction,
  the wells include a labeled antibody well that stores a labeled antibody that labels the object, and
  there is provided a structure that does not heat the labeled antibody well.

[2] The temperature adjustment stage according to [1], in which
  the wells further include at least one of a cleaning liquid well, a mixed diluent well, a specimen dilution well, or a measurement reagent well, and
  there is provided a structure that heats at least one of the cleaning liquid well, the mixed diluent well, the specimen dilution well, or the measurement reagent well.

[3] The temperature adjustment stage according to [2], further including
  a mounting recess to be mounted with the cartridge, in which
  the mounting recess is formed with a recess that prevents a bottom part of the labeled antibody well from coming into contact with the temperature adjustment stage when the cartridge is mounted in the mounting recess, and at least one of a bottom part of the cleaning liquid well, a bottom part of the mixed diluent well, a bottom part of the specimen dilution well, or a bottom part of the measurement reagent well substantially contacts with the temperature adjustment stage.

[4] The temperature adjustment stage according to [2], further including:
  a mounting recess to be mounted with the cartridge; and
  a heater disposed on a back surface of the temperature adjustment stage, in which
  the heater is not disposed at a position corresponding to a position of the labeled antibody well when the cartridge is mounted in the mounting recess, but is disposed at a position corresponding to a position of at least one of the cleaning liquid well, the mixed diluent well, the specimen dilution well, or the measurement reagent well.

[5] The temperature adjustment stage according to [3] or [4], in which, in the mounting recess, an assisting part having a shape corresponding to a shape of a bottom part of the cleaning liquid well is formed at a position corresponding to a position of the cleaning liquid well when the cartridge is mounted in the mounting recess.

[6] The temperature adjustment stage according to any one of [3] to [5], in which
the cartridge includes: a flow path chip formed with, in a flow path, a reaction field in which the immunoreaction is performed; and an optical measurement chip having a prism that reflects light at a position including the reaction field, and
the mounting recess includes at least one of an abutting surface that abuts with a bottom surface of the optical measurement chip, or a wall part that contacts with a side surface of the optical measurement chip.
[7] The temperature adjustment stage according to any one of [3] to [6], further including:
a side wall formed around the mounting recess, in which a part of the side wall is formed with a cut-out part having a reduced height.

Advantageous Effects of Invention

According to the temperature adjustment stage of the present invention, the cartridge can be efficiently heated in accordance with necessity of heating each well.

DESCRIPTION OF EMBODIMENTS

Hereinafter, a temperature adjustment stage according to a first embodiment of the present invention will be described with reference to the drawings, with a temperature adjustment stage for heating a cartridge as an example. Note that the cartridge is used for an inspection system for surface plasmon-field enhanced fluorescence spectroscopy (SPFS) measurement and the like.

Figure 1:
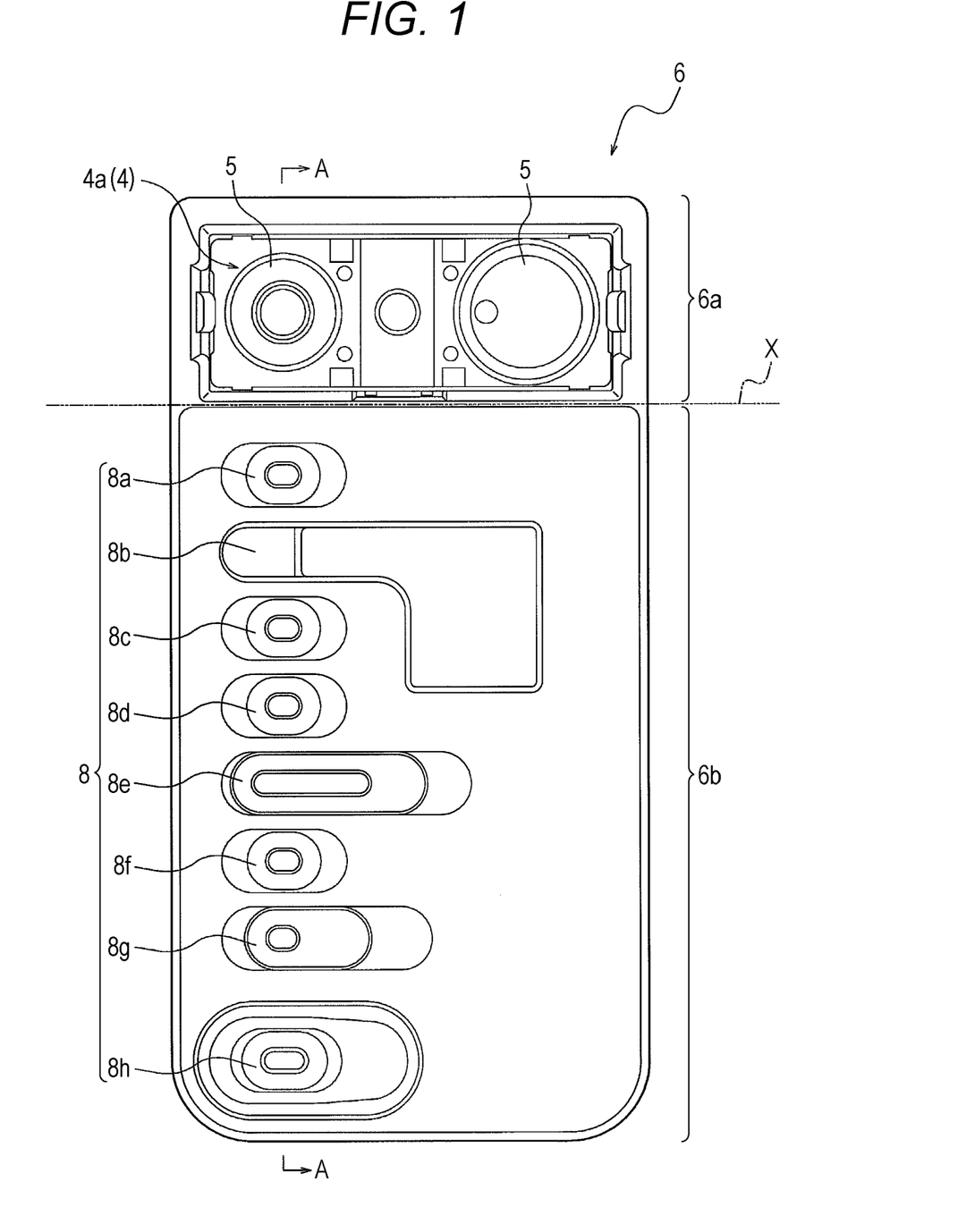
FIG. 1 is a plan view showing a front surface of a cartridge according to a first embodiment.
Figure 2:
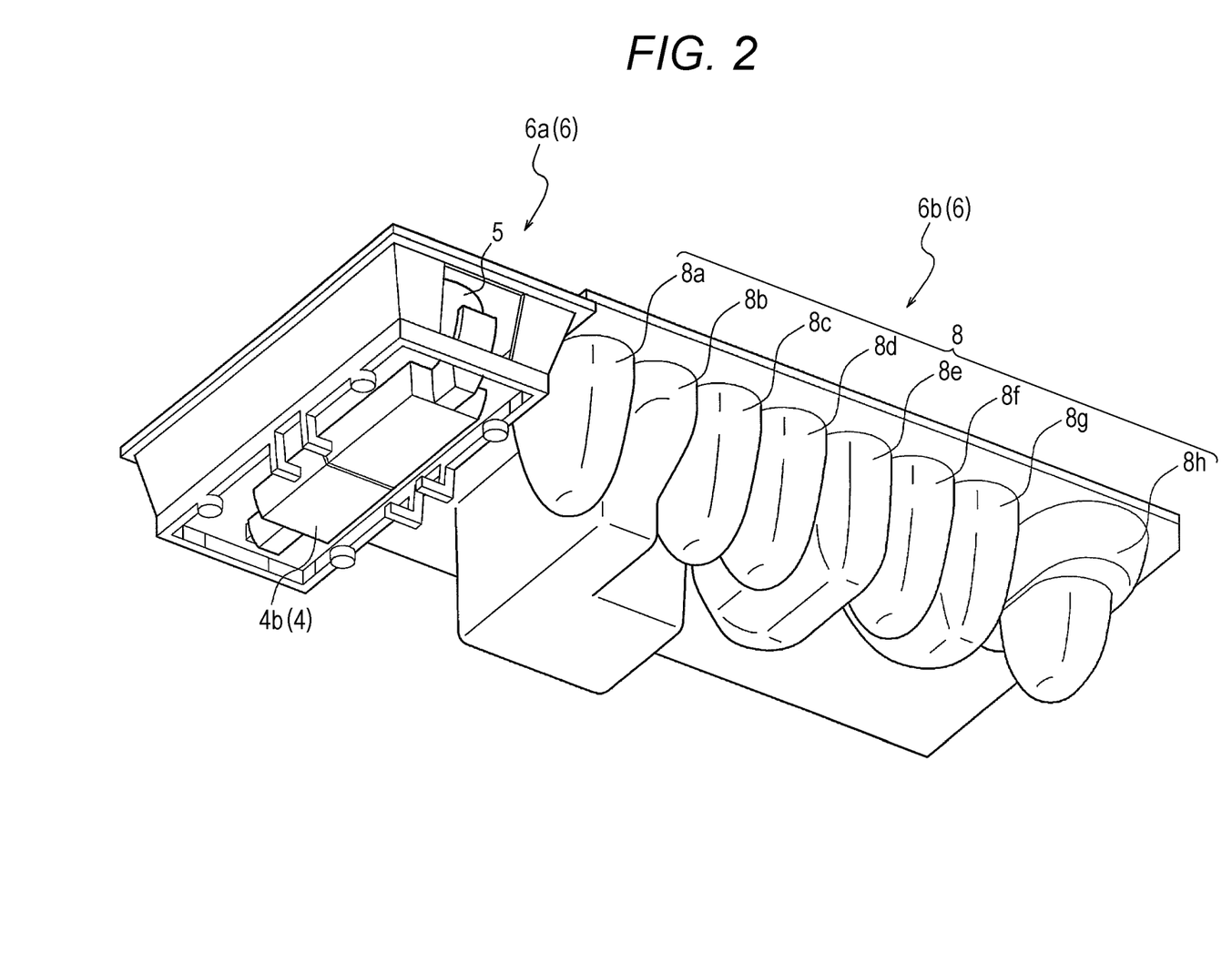
FIG. 2 is a perspective view of the cartridge according to the first embodiment as viewed from a back surface side.

FIG. 1 is a plan view showing a front surface of the cartridge according to the first embodiment, and FIG. 2 is a perspective view of the cartridge viewed from a back surface side. As shown in FIGS. 1 and 2, a cartridge 6 is a rectangular member in plan view including an arrangement part 6a and a well formation part 6b, and is formed by a resin member such as polystyrene or polypropylene. Note that a straight line X shown in FIG. 1 indicates a boundary between the arrangement part 6a and the well formation part 6b.

The arrangement part 6a is made by an opening formed at one end in a longitudinal direction of the cartridge 6, and a sensing member 4 is arranged in this opening. Further, in the well formation part 6b, there are formed a plurality of concave wells 8 that store a liquid such as a reagent or a specimen used in an inspection system.

The sensing member 4 includes a flow path chip 4a and an optical measurement chip 4b. The flow path chip 4a is a chip arranged above the optical measurement chip 4b, and includes two cylindrical injection/discharge parts 5 for injection and discharge of a liquid such as a specimen or a reagent. In addition, between the two injection/discharge parts 5, a flow path (not shown) to guide a specimen or a reagent to a reaction field (not shown) is formed.

The optical measurement chip 4b includes: a prism that is a dielectric member formed of a hexahedron (truncated pyramid shape) having a substantially trapezoidal cross section; and a rectangular metal thin film (reaction field forming surface) (not shown) arranged on a top surface of the prism. Note that, in a central part of the metal thin film, the reaction field for an immunoreaction of a reactant contained in a specimen or a reagent is formed.

Note that, since a flow path into which a liquid such as a specimen or a cleaning liquid is sequentially introduced needs to be maintained at an appropriate temperature that does not affect an immunoreaction in the reaction field. Therefore, in the present embodiment, the temperature adjustment stage is used to heat the sensing member 4.

The well 8 includes a measurement reagent well 8a, a waste liquid well 8b, a labeled antibody liquid well 8c, a spare well 8d, a cleaning liquid well 8e, a mixed diluent well 8f, a specimen diluent well 8g, and a specimen holding well 8h.

Here, the measurement reagent well 8a, the labeled antibody liquid well 8c, the spare well 8d, and the mixed diluent well 8f have the same volume. Further, these four wells 8 are the wells 8 having a smallest volume. Next, the volume increases in the order of the specimen diluent well 8g, the cleaning liquid well 8e, and the specimen holding well 8h, and the waste liquid well 8b has the largest volume.

The measurement reagent well 8a stores an any given measurement reagent used for SPFS measurement. Since the measurement reagent is preferably in the same state as the specimen at the time of measurement, the measurement reagent well 8a is preferably heated.

The waste liquid well 8b has a substantially L-shaped opening and a bottom surface. Since the waste liquid well 8b stores, as a waste liquid, a liquid injected into and discharged from the flow path of the flow path chip 4a, heating is not particularly necessary.

The labeled antibody liquid well 8c stores a labeled antibody liquid labeled with a fluorescent dye or the like. This labeled antibody liquid is for labeling, as an object, an analyte in a specimen captured by an antigen-antibody reaction in the reaction field formed in the flow path.

Here, the analyte is, for example, a protein, a lipid, a nucleic acid, or other biological substance. Specifically, blood and saliva correspond to this. Further, cardiac troponin I (cTnI), cardiac troponin T (cTnT), brain natriuretic peptide (BNP), myoglobin, creatine kinase isozyme MB (CKMB), and the like, which are cardiac markers contained in blood, may be treated as the analyte.

Further, examples of a representative fluorescent dye used for labeling include a fluorescent substance. As the fluorescent substance, rhodamine dye molecules, squarylium dye molecules, cyanine dye molecules, aromatic ring dye molecules, oxazine dye molecules, carbopyronine dye molecules, pyrromethene dye molecules, and the like may be exemplified. Alternatively, it is possible to use Alexa Fluor (registered trademark, manufactured by Invitrogen Corporation) dye molecules, BODIPY (registered trademark, manufactured by Invitrogen Corporation) dye molecules, Cy (registered trademark, manufactured by GE Healthcare) dye molecules, DY dye molecules (registered trademark, manufactured by Dyomics GmbH), HiLyte (registered trademark, manufactured by AnaSpec, Inc.) dye molecules, DyLight (registered trademark, Thermo Fisher Scientific Inc.) dye molecules, ATTO (registered trademark, manufactured by ATTO-TEC GmbH) dye molecules, MFP (registered trademark, manufactured by MoBiTec GmbH) dye molecules, and the like.

Since there is a concern that a labeled antibody liquid will be denatured to lower reaction efficiency when heated, it is desirable not to heat before reaction. For this reason, in the present embodiment, the labeled antibody liquid well 8c is not heated.

The spare well 8d is, for example, a spare well 8 provided on the assumption that preparation or treatment of another chemical agent may be required depending on an inspection item. In the present embodiment, since the spare well 8d is a well 8 that is not particularly used, and thus is not necessarily to be particularly heated.

The cleaning liquid well 8e is a well 8 that stores a cleaning liquid to clean a liquid injected into and discharged from the flow path of the flow path chip 4a. Since the cleaning liquid is also injected into and discharged from the flow path, the cleaning liquid well 8e that stores the cleaning liquid needs to be heated.

The mixed diluent well 8f is for mixing a specimen and a specimen diluent. This mixing causes the specimen to be diluted to a predetermined concentration. Since the diluted mixed diluent is injected into and discharged from the flow path of the flow path chip 4a, heating is desired. That is, in the present embodiment, the mixed diluent well 8f needs to be heated.

The specimen diluent well 8g is a well 8 that stores a specimen diluent to be dispensed into the mixed diluent well 8f. Therefore, in the present embodiment, the mixed diluent well 8f needs to be heated.

The specimen holding well 8h is a well 8 to hold a specimen such as blood and saliva. In the present embodiment, the specimen holding well 8h is also preferably heated.

That is, among the wells 8 formed in the well formation part 6b, the labeled antibody liquid well 8c is the well 8 that is not suitable for heating, while the measurement reagent well 8a, the cleaning liquid well 8e, the mixed diluent well 8f, the specimen diluent well 8g, and the specimen holding well 8h are the wells 8 that are to be heated. Further, the waste liquid well 8b is the well 8 that does not need to be heated.

Note that, for the measurement reagent, the cleaning liquid, the labeled antibody liquid, and the specimen diluent, for example, phosphate buffered saline (PBS), Tris buffered saline (TBS), HEPES buffered saline (HBS), and the like are used as a main component.

Figure 3:
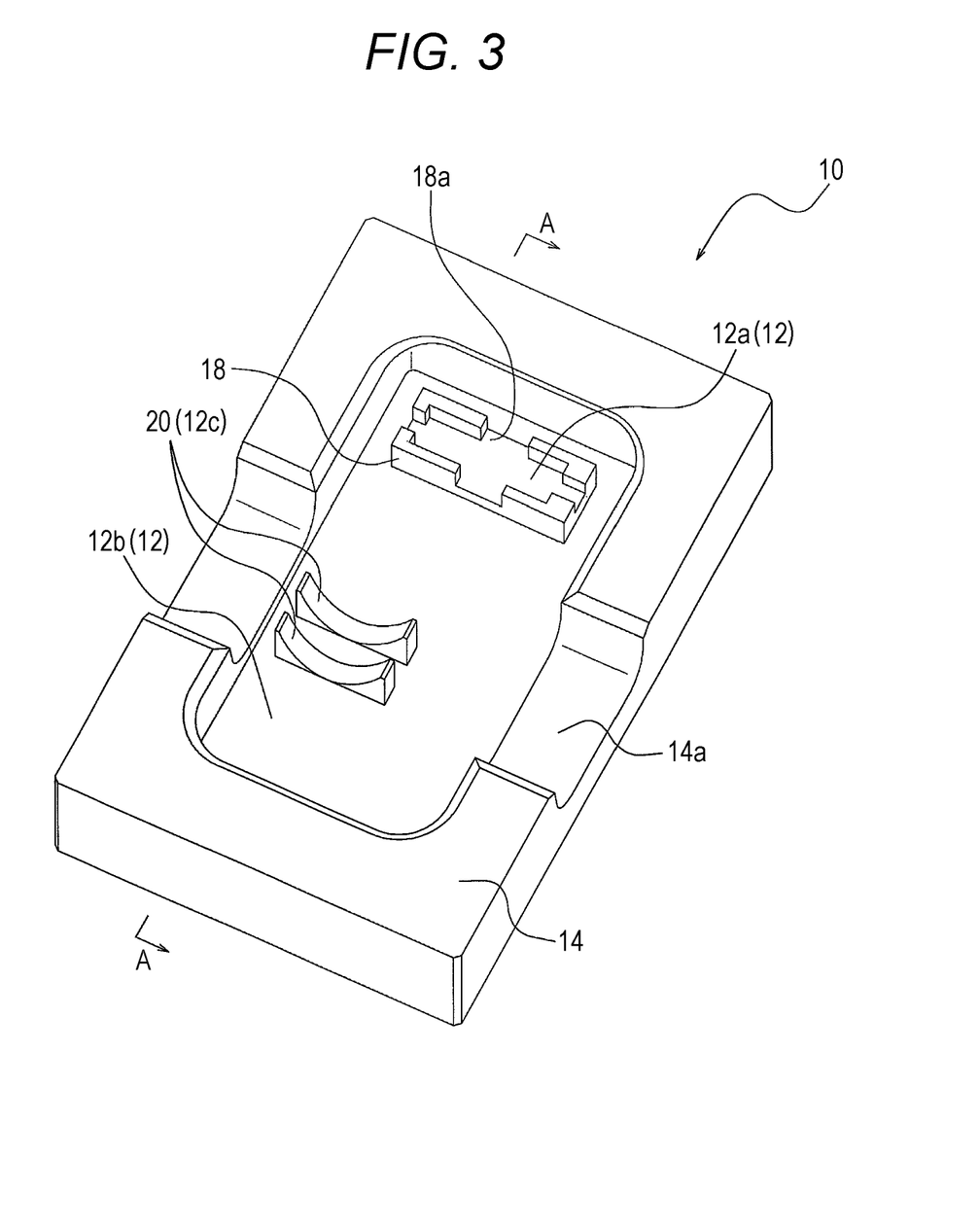
FIG. 3 is a perspective view of a temperature adjustment stage according to the first embodiment as viewed from a front surface side.
Figure 4:
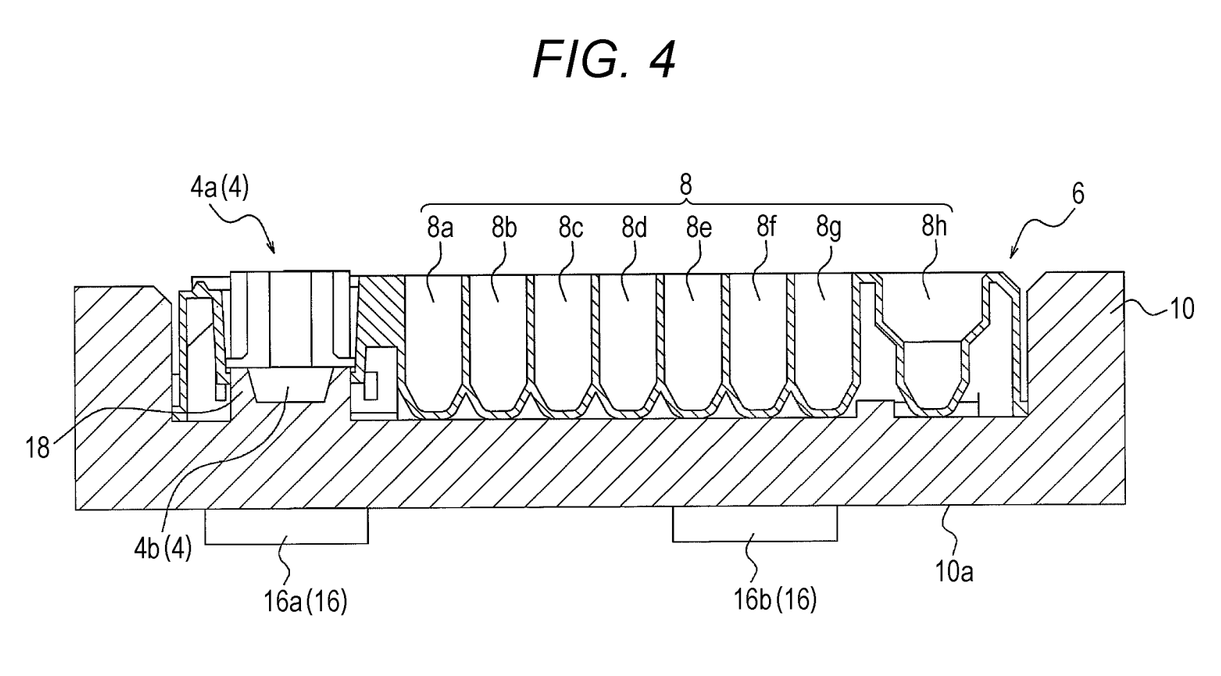
FIG. 4 is a cross-sectional view showing a state where the cartridge is mounted on the temperature adjustment stage according to the first embodiment.

FIG. 3 is a perspective view of a temperature adjustment stage 10 according to the first embodiment as viewed from a front surface side, and FIG. 4 is a cross-sectional view showing a state where the cartridge 6 attached with the sensing member 4 is mounted on the temperature adjustment stage 10. This cross-sectional view is a cross-sectional view taken along line A-A in FIGS. 1 and 3. Note that, for example, this temperature adjustment stage 10 is used when the cartridge 6 taken out from a storage such as a refrigerator is heated in advance before being used in the inspection system, or when the cartridge 6 is heated while liquid supply or reaction is performed in the inspection system. In the latter case, the temperature adjustment stage 10 is installed and used in a reaction detection portion of the inspection system.

As shown in FIG. 3, the temperature adjustment stage 10 is a substantially planar rectangular stage formed with a mounting recess 12 to be mounted with the cartridge 6, and the side wall 14 surrounding the mounting recess 12, and is made of metal such as aluminum. Further, as shown in FIG. 4, a heater 16 is disposed on a back surface 10a of the temperature adjustment stage 10.

Here, the mounting recess 12 is formed so as to correspond to a shape of the cartridge 6, and the mounting recess 12 is formed with an abutting surface 12a, an installation surface 12b, an assisting part 12c, and a wall part 18, individually.

The abutting surface 12a is a surface that abuts with a bottom surface of the optical measurement chip 4b when the cartridge 6 is mounted in the mounting recess 12, as shown in FIG. 4. Further, the installation surface 12b is a surface that substantially abuts with a bottom part of each well 8 (the measurement reagent well 8a, the waste liquid well 8b, the labeled antibody liquid well 8c, the spare well 8d, the cleaning liquid well 8e, the mixed diluent well 8f, the specimen diluent well 8g, and the specimen holding well 8h) when the cartridge 6 is mounted in the mounting recess 12. Here, the expression "substantially abut" is used because there is also a case where a gap of about ±0.5 mm is generated between the bottom part of each well 8 and the mounting recess 12.

The assisting part 12c is arranged at a position immediately below the cleaning liquid well 8e in the mounting recess 12 (a position corresponding to a position of the cleaning liquid well 8e). This assisting part 12c includes two protrusions 20 extending substantially parallel to a short side direction of the temperature adjustment stage 10, and a center of each protrusion 20 is sloped in a substantially U shape. Since the assisting part 12c has such a shape, when the cartridge 6 is mounted in the mounting recess 12, a bottom part of the cleaning liquid well 8e substantially contacts with the substantially U-shaped sloped portion of the assisting part 12c over a wide area (it means that there may be a gap similarly to the case of the substantial abutting described above). Therefore, the cleaning liquid can be reliably heated.

Note that the shape of the protrusion 20 of the assisting part 12c does not necessarily need to be sloped in a substantially U-shape at the center, but only needs to have a shape corresponding to a shape of the bottom part of the cleaning liquid well 8e so as to substantially contacts with the bottom part of the cleaning liquid well 8e.

The wall part 18 is a wall body surrounding the abutting surface 12a in a rectangular shape and having a height of 7.0 mm to 8.0 mm, and an inner wall surface thereof abuts with a side surface of the optical measurement chip 4b when the cartridge 6 is mounted in the mounting recess 12. Further, a top part of the wall part 18 abuts with the flow path chip 4a. This increases a contact area of the temperature adjustment stage 10 with the optical measurement chip 4b and the flow path chip 4a, and can properly heat the optical measurement chip 4b and the flow path chip 4a. Note that a plurality of cut outs 18a are formed in the wall part 18, to prevent the optical measurement chip 4b from becoming difficult to come off due to friction of the wall part 18.

In addition, a cut-out part 14a having a reduced height is formed in a part of the side wall 14. This facilitates attachment and detachment of the cartridge 6 to and from the mounting recess 12.

Further, as shown in FIG. 4, the heater 16 is divided into a first heater part 16a and a second heater part 16b. Here, the first heater part 16a is arranged at a position immediately below the sensing member 4 (a position corresponding to a position of the sensing member 4) when the cartridge 6 is mounted in the mounting recess 12, and the second heater part 16b is arranged at a position immediately below the cleaning liquid well 8e, the mixed diluent well 8f, and the specimen diluent well 8g (a position corresponding to the cleaning liquid well 8e, the mixed diluent well 8f, and the specimen diluent well 8g) when the cartridge 6 is mounted in the mounting recess 12.

That is, on the back surface 10a of the temperature adjustment stage 10, the heater 16 is not arranged at a position immediately below the measurement reagent well 8a, the waste liquid well 8b, and the labeled antibody liquid well 8c (a position corresponding to a position of the measurement reagent well 8a, the waste liquid well 8b, and the labeled antibody liquid well 8c) but is arranged at a position separated from the labeled antibody liquid well 8c. Therefore, in the present embodiment, when the cartridge 6 is mounted in the mounting recess 12, it is possible to suppress a temperature rise of the waste liquid and the labeled antibody liquid. Note that the first heater part 16a may be extended to a position immediately below the measurement reagent well 8a (a position corresponding to a position of the measurement reagent well 8a) so that the measurement reagent can be heated more effectively.

According to the temperature adjustment stage 10 according to the first embodiment, by not arranging the heater immediately below the well 8 that does not need to be heated (a position corresponding to a position of the well 8 that does not need to be heated) when the cartridge 6 is mounted in the mounting recess 12, the cartridge 6 can be efficiently heated in accordance with the necessity of heating each well 8.

In particular, by not arranging the heater immediately below the labeled antibody liquid well 8c (a position corresponding to a position of the labeled antibody liquid well 8c), it can be prevented that the labeled antibody liquid before reaction is heated and the antibody is denatured to lower the reaction efficiency.

Note that, in the first embodiment described above, as shown in FIG. 5, a non-contact recess 13 (recess) may be formed immediately below the well 8 that does not need to be heated (a position corresponding to a position of the well 8 that does not need to be heated), to prevent the well 8 that does not need to be heated from directly abutting on the temperature adjustment stage 10, and to cause only the well 8 that needs to be heated to substantially abut directly on the temperature adjustment stage 10 when the cartridge 6 is mounted in the mounting recess 12.

Figure 5:
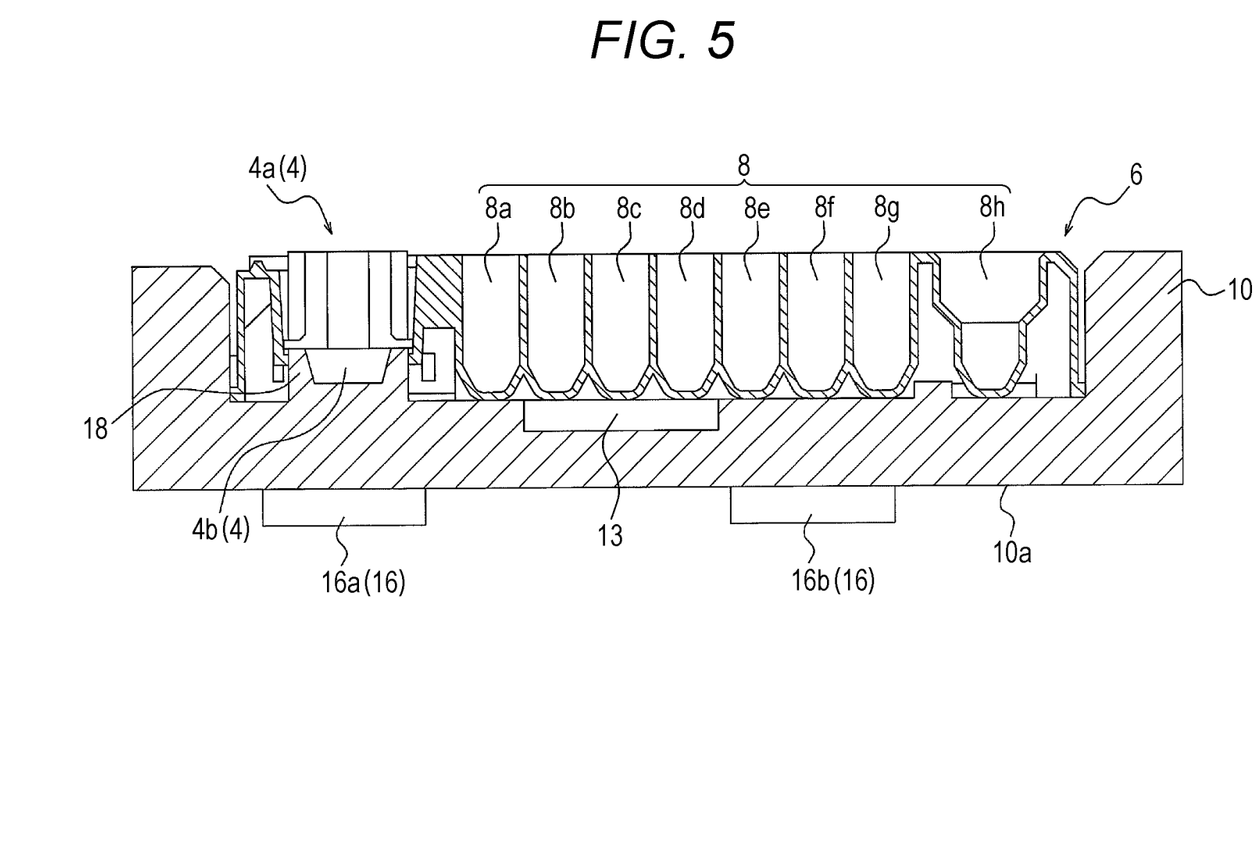
FIG. 5 is a cross-sectional view showing a state where the cartridge is mounted on the temperature adjustment stage according to a modification of the first embodiment.

This can more properly suppress heating of the well 8 that does not need to be heated. Note that the well 8 that does not need to be heated here means the waste liquid well 8b, the labeled antibody liquid well 8c, and the spare well 8d, and particularly refers to the labeled antibody liquid well 8c. Note that the non-contact recess 13 may be left as a void, but a material having low thermal conductivity such as rubber may be disposed in the non-contact recess 13.

Next, a temperature adjustment stage according to a second embodiment will be described. The second embodiment is a modification of the first embodiment, and therefore, portions different from the first embodiment will be described in detail, and description of overlapping portions will be omitted.

Figure 6:
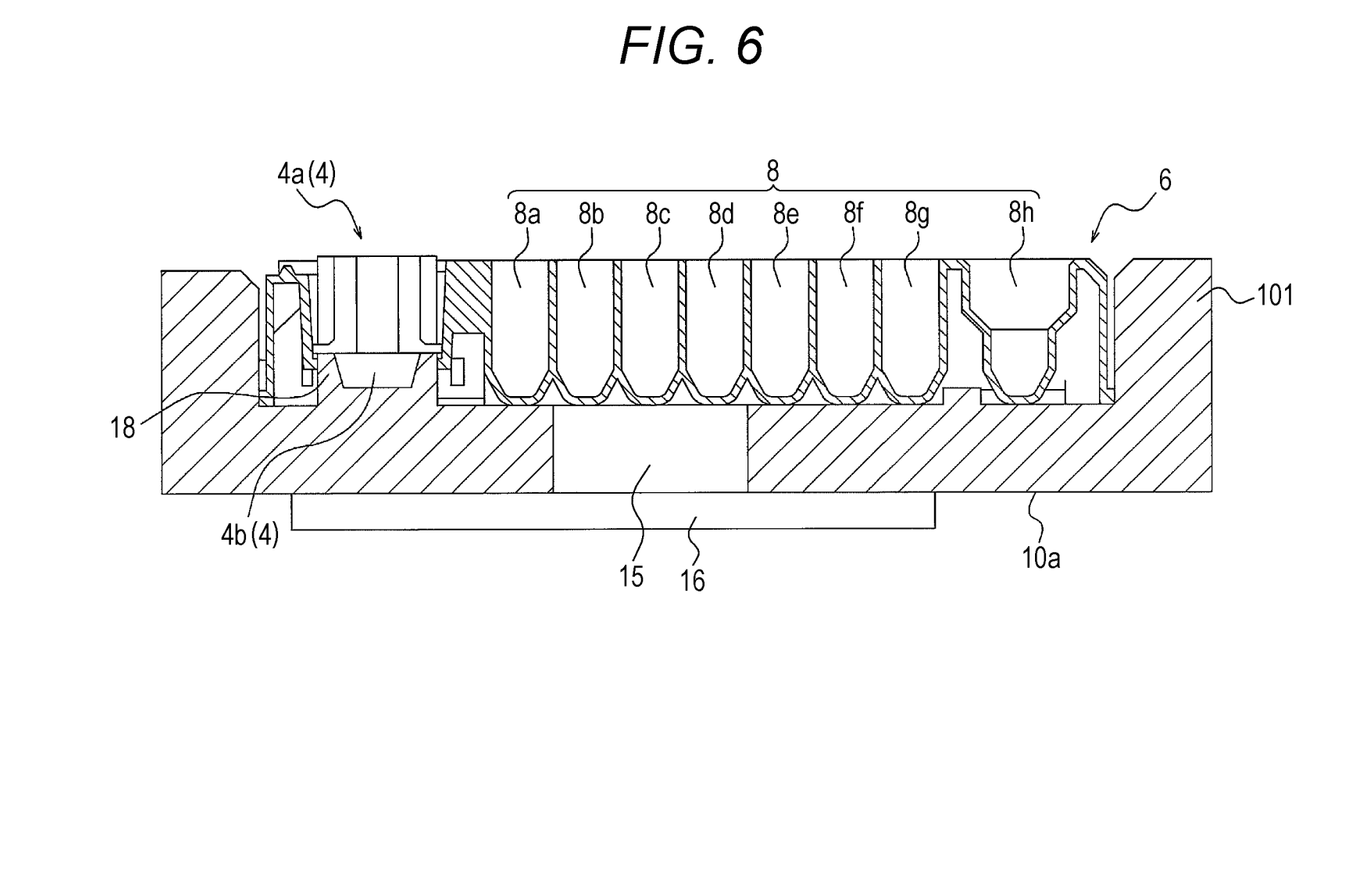
FIG. 6 is a cross-sectional view showing a state where a cartridge is mounted on a temperature adjustment stage according to a second embodiment.

FIG. 6 is a cross-sectional view showing a state where a cartridge according to the second embodiment is mounted on a temperature adjustment stage according to the second embodiment. As shown in FIG. 6, on a back surface 10a of a temperature adjustment stage 101, a recessed part 15 (recess) is provided instead of the non-contact recess 13 of the first embodiment.

Here, similarly to the non-contact recess 13, the recessed part 15 is provided immediately below a well 8 that does not need to be heated. Note that, unlike the non-contact recess 13, the recessed part 15 penetrates to the back surface 10a of the temperature adjustment stage 101 and has high heat insulation, and therefore a single undivided heater 16 can be used. This can also suppress heating of the well 8 that does not need to be heated, represented by a labeled antibody liquid well 8c.

Next, a temperature adjustment stage according to a third embodiment will be described. The third embodiment is a modification of the first embodiment, and therefore, portions different from the first embodiment will be described in detail, and description of overlapping portions will be omitted.

Figure 7:
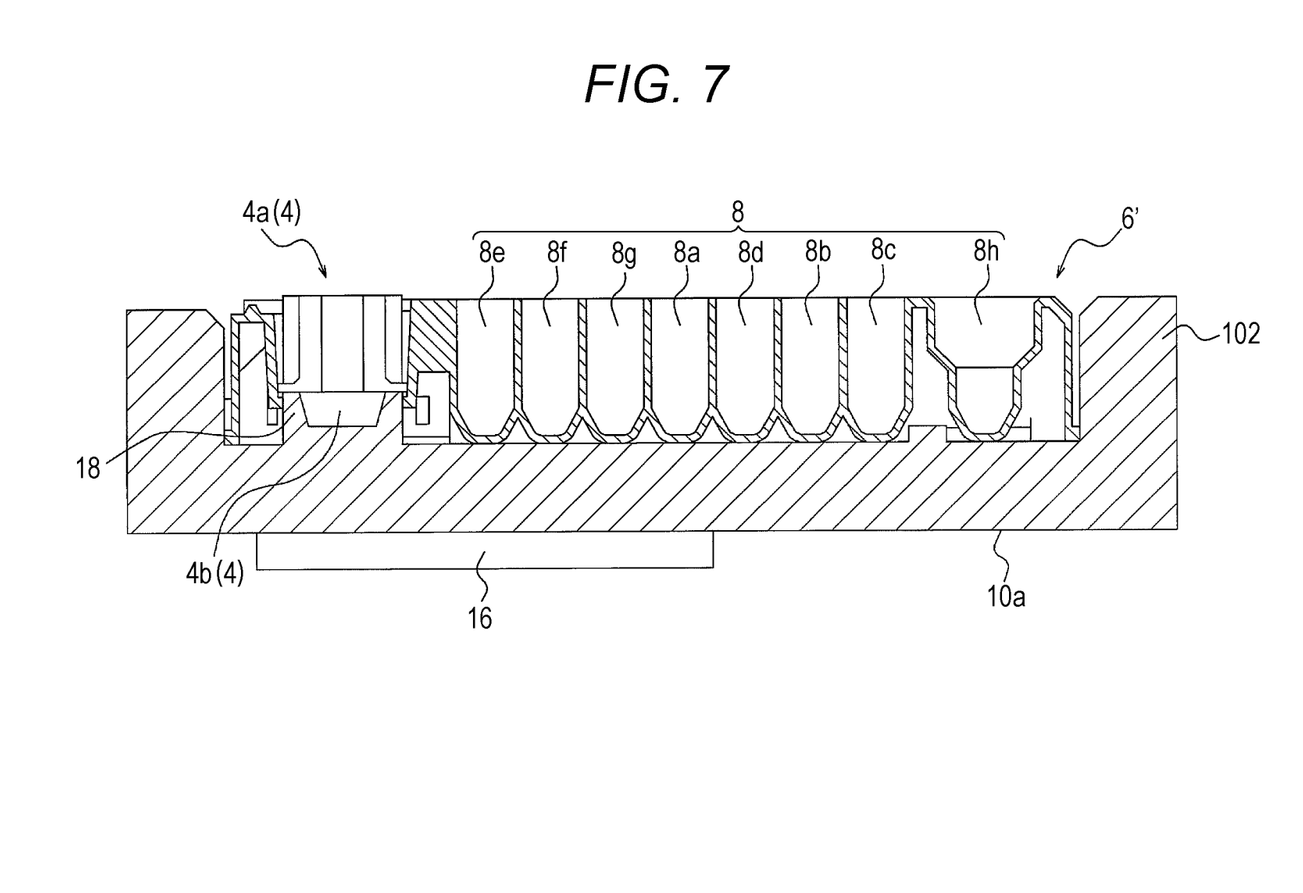
FIG. 7 is a cross-sectional view showing a state where a cartridge is mounted on a temperature adjustment stage according to a third embodiment.

FIG. 7 is a cross-sectional view showing a state where a cartridge according to the third embodiment is mounted on a temperature adjustment stage according to the third embodiment. As shown in FIG. 7, in a cartridge 6' according to the third embodiment, a labeled antibody liquid well 8c is arranged away from a position of a sensing member 4. Specifically, wells 8 are arranged, from the sensing member 4 side, in the order of a cleaning liquid well 8e, a mixed diluent well 8f, a specimen diluent well 8g, a measurement reagent well 8a, a spare well 8d, a waste liquid well 8b, the labeled antibody liquid well 8c, and a specimen holding well 8h.

In this way, by arranging the labeled antibody liquid well 8c away from the position of the sensing member 4, and arranging the cleaning liquid well 8e, the mixed diluent well 8f, and the specimen diluent well 8g that need to be heated in the vicinity of the sensing member 4 in a concentrated manner, it is possible to provide a temperature adjustment stage 102 using a single undivided heater 16. This can also suppress heating of the well 8 that does not need to be heated, represented by a labeled antibody liquid well 8c.

Further, in each of the above-described embodiments, a case has been described as an example in which the temperature adjustment stage 10 includes the heater 16, and the well 8 is heated by the heater 16, but the temperature adjustment stage 10 does not necessarily need to include the heater 16. For example, in the first and second embodiments, the temperature adjustment stage 10 may be heated in advance by warm air such as air, carbon dioxide gas, or nitrogen gas. In this case, a corresponding portion of the temperature adjustment stage 10 can be heated without unevenness.

Further, the temperature adjustment stage 10 may be mounted on a heat medium circulating mechanism that internally circulates a liquid such as water, and the temperature adjustment stage 10 may be heated. In this case, the heat medium may be air, carbon dioxide gas, or nitrogen gas instead of liquid.

In addition, in each of the above-described embodiments, a description has been made with, as an example, an integrally connected type cartridge 6 in which the arrangement part 6a for arrangement of the sensing member 4 is integrated with the well formation part 6b, but a separated cartridge may be adopted in which a cartridge formed with the arrangement part 6a and a cartridge formed with the well formation part 6b are individually independent.

Further, in each of the above-described embodiments, the temperature adjustment stage is not necessarily limited to that used in the inspection system for SPFS measurement. For example, the temperature adjustment stage may be that used for an immunoassay device.

Further, in each of the above-described embodiments, the cartridge 6 only needs to include, as the well 8 to be heated, at least one of the measurement reagent well 8a, the cleaning liquid well 8e, the mixed diluent well 8f, or the specimen diluent well 8g.

Further, in each of the above-described embodiments, a case has been exemplified in which all the respective bottom parts of the measurement reagent well 8a, the cleaning liquid well 8e, the mixed diluent well 8f, and the specimen diluent well 8g, which are the wells 8 to be heated, are substantially abutting on the temperature adjustment stage 10, but the bottom parts of all the wells 8 do not necessarily need to abut. That is, it is sufficient to have a configuration in which a bottom part of at least one of the measurement reagent well 8a, the cleaning liquid well 8e, the mixed diluent well 8f, and the specimen diluent well 8g, which are the wells 8 to be temperature-controlled, is substantially abutting on the temperature adjustment stage 10 and heated.

In addition, in each of the above-described embodiments, a case has been described as an example in which the cartridge 6 and the temperature adjustment stage 10 are used in using the inspection system for SPFS measurement, but the cartridge 6 and the temperature adjustment stage 10 may be used in an inspection system for other than the SPFS measurement.

REFERENCE SIGNS LIST

4 Sensing member
4a Flow path chip
4b Optical measurement chip
5 Injection/discharge part
6 Cartridge
6a Arrangement part
6b Well formation part
8 Well
8a Measurement reagent well
8b Waste liquid well
8c Labeled antibody liquid well
8d Spare well
8e Cleaning liquid well
8f Mixed diluent well
8g Specimen diluent well
8h Specimen holding well
10, 101, 102 Temperature adjustment stage
10a Back surface
12 Mounting recess
12a Abutting surface
12b Installation surface
12c Assisting part
13 Non-contact recess
14 Side wall
14a Cut-out part
15 Recessed part
16 Heater
16a First heater part
16b Second heater part
18 Wall part
18a Cut out
20 Protrusion

The invention claimed is:

1. A system comprising:
a cartridge in which a plurality of wells that store a liquid are formed; and
a temperature adjustment stage for heating the cartridge, wherein
the cartridge is used in an inspection system that detects an object captured by an immunoreaction,
the plurality of the wells include a labeled antibody well that stores a labeled antibody that labels the object, and a cleaning liquid well,
the temperature adjustment stage is configured to adjust a temperature of the labeled antibody well lower than a temperature of the cleaning liquid well,
the temperature adjustment stage comprises a mounting recess in which the cartridge is mounted, and
the mounting recess is provided with an assisting part having a shape corresponding to a shape of a bottom part of the cleaning liquid well at a position corresponding to a position of the cleaning liquid well when the cartridge is mounted in the mounting recess.

2. The system according to claim 1, wherein
the plurality of the wells further include at least one of a mixed diluent well, a specimen dilution well, or a measurement reagent well, and
the temperature adjustment stage is configured to heat at least one of the cleaning liquid well, the mixed diluent well, the specimen dilution well, or the measurement reagent well.

3. The system according to claim 2, wherein the mounting recess is formed with a recess that prevents a bottom part of the labeled antibody well from coming into contact with the temperature adjustment stage when the cartridge is mounted in the mounting recess, and at least one of the bottom part of the cleaning liquid well, a bottom part of the mixed diluent well, a bottom part of the specimen dilution well, or a bottom part of the measurement reagent well contacts with the temperature adjustment stage.

4. The system according to claim 2, wherein the mounting recess is disposed on a first surface of the temperature adjustment stage, the temperature adjustment stage further comprises:
a heater disposed on a second surface of the temperature adjustment stage, the first and second surfaces being opposite to each other, and the heater is not disposed at a position corresponding to a position of the labeled antibody well when the cartridge is mounted in the mounting recess, but is disposed at a position corresponding to a position of at least one of the cleaning liquid well, the mixed diluent well, the specimen dilution well, or the measurement reagent well.

5. The system according to claim 3, wherein
the cartridge includes: a flow path chip having a flow path and a reaction field in the flow path, wherein the immunoreaction is performed in the reaction field; and an optical measurement chip having a prism that reflects light at a position including the reaction field, and
the mounting recess includes at least one of an abutting surface that abuts with a bottom surface of the optical measurement chip, or a wall part that contacts with a side surface of the optical measurement chip.

6. The system according to claim 3, wherein the temperature adjustment stage further comprises: a wall formed around the mounting recess, and a part of the wall is cut out from an inner surface to an outer surface of the wall.

7. The system according to claim 4, wherein
the cartridge includes: a flow path chip having a flow path and a reaction field in the flow path, wherein the immunoreaction is performed in the reaction field; and an optical measurement chip having a prism that reflects light at a position including the reaction field, and the mounting recess includes at least one of an abutting surface that abuts with a bottom surface of the optical measurement chip, or a wall part that contacts with a side surface of the optical measurement chip.

8. The system according to claim 4, wherein the temperature adjustment stage further comprises: a wall formed around the mounting recess, and a part of the wall is cut out from an inner surface to an outer surface of the wall.

9. The system according to claim 1, wherein the cartridge includes: a flow path chip having a flow path and a reaction field in the flow path, wherein the immunoreaction is performed in the reaction field; and an optical measurement chip having a prism that reflects light at a position including the reaction field, and the mounting recess includes at least one of an abutting surface that abuts with a bottom surface of the optical measurement chip, or a wall part that contacts with a side surface of the optical measurement chip.

10. The system according to claim 1, wherein the temperature adjustment stage further comprises: a wall formed around the mounting recess, and a part of the wall is cut out from an inner surface to an outer surface of the wall.

11. The system according to claim 5, wherein the temperature adjustment stage further comprises: a wall formed around the mounting recess, and a part of the wall is cut out from an inner surface to an outer surface of the wall.

12. The system according to claim 1, wherein when the cartridge is mounted in the mounting recess, a contact area where the cleaning liquid well comes into contact with the mounting recess is greater than a contact area where the labeled antibody well comes into contact with the mounting recess.

* * * * *